US009584688B2

(12) United States Patent
Mori

(10) Patent No.: US 9,584,688 B2
(45) Date of Patent: Feb. 28, 2017

(54) DEVICE ADMINISTRATION SYSTEM AND DEVICE

(71) Applicant: BROTHER KOGYO KABUSHIKI KAISHA, Nagoya-shi, Aichi-ken (JP)

(72) Inventor: Takafumi Mori, Nagoya (JP)

(73) Assignee: BROTHER KOGYO KABUSHIKI KAISHA, Nagoya-shi, Aichi-Ken (JP)

( * ) Notice: Subject to any disclaimer, the term of this patent is extended or adjusted under 35 U.S.C. 154(b) by 0 days.

(21) Appl. No.: 14/755,170

(22) Filed: Jun. 30, 2015

(65) Prior Publication Data
US 2015/0381842 A1 Dec. 31, 2015

(30) Foreign Application Priority Data
Jun. 30, 2014 (JP) ................. 2014-135162

(51) Int. Cl.
H04N 1/00 (2006.01)
G06F 3/12 (2006.01)
H04N 1/44 (2006.01)

(52) U.S. Cl.
CPC ....... *H04N 1/00925* (2013.01); *G06F 3/1222* (2013.01); *G06F 3/1239* (2013.01); *G06F 3/1288* (2013.01); *H04N 1/4426* (2013.01); *G06F 3/1238* (2013.01); *H04N 2201/0094* (2013.01)

(58) Field of Classification Search
None
See application file for complete search history.

(56) References Cited

U.S. PATENT DOCUMENTS

| 2005/0275868 | A1* | 12/2005 | Higashiura | G06K 15/002 358/1.14 |
|---|---|---|---|---|
| 2007/0296998 | A1* | 12/2007 | Iwamoto | G06F 21/606 358/1.14 |
| 2008/0028448 | A1* | 1/2008 | Tsuchitoi | G06F 3/1214 726/6 |
| 2008/0068647 | A1 | 3/2008 | Isobe et al. | |

(Continued)

FOREIGN PATENT DOCUMENTS

JP 2008-104143 A 5/2008

*Primary Examiner* — Fan Zhang
(74) *Attorney, Agent, or Firm* — Scully, Scott, Murphy & Presser, P.C.

(57) ABSTRACT

A device administration system includes a device and a first server. The first server transmits restriction information, for restriction on use of a function of the device, and first destination information, indicating a destination of transmission of authentication information for cancel of the restriction, to the device without a request of the device. The device is configured to: upon receiving the transmitted restriction information, restrict the use of the function corresponding to it; upon receiving the transmitted first destination information, store it; accept the authentication information that is input for removal of the restriction; upon accepting the authentication information, transmit the accepted authentication information to a destination indicated by the stored first destination information; and upon receiving permission information from the destination of transmission, cancel the restriction of the use of the function. The permission information permits the use of the function.

6 Claims, 11 Drawing Sheets

(56) References Cited

U.S. PATENT DOCUMENTS

| | | | |
|---|---|---|---|
| 2009/0070864 A1* | 3/2009 | Nishida | G06F 21/31 726/7 |
| 2012/0307292 A1* | 12/2012 | Urakawa | H04L 65/105 358/1.15 |
| 2012/0327454 A1* | 12/2012 | Hasama | G06F 3/122 358/1.14 |
| 2013/0096730 A1* | 4/2013 | Numata | G06K 15/40 700/297 |
| 2016/0070405 A1* | 3/2016 | Wada | G06F 1/16 345/173 |

* cited by examiner

FIG.2A

| OWNER ID | DEVICE ID | RESTRICTION STATUS (PC PRINT RESTRICTION) | AUTHENTICATION URL | RESULT NOTIFICATION URL | SETTING STATUS |
|---|---|---|---|---|---|
| abc123 | Device1 | OFF | 0 | 0 | 0 |
| abc123 | Device2 | ON | http://aaa.com/auth1 | http://aaa.com/ntfy1 | SET |
| abc123 | Device3 | ON | http://aaa.com/auth2 | http://aaa.com/ntfy2 | UNSET |
| efg789 | Device4 | ON | http://aaa.com/auth3 | http://aaa.com/ntfy3 | SET |
| ... | ... | ... | ... | ... | ... |

FIG.2B

| USER NAME | USER ID | PASSWORD |
|---|---|---|
| ○○○○ | employee1 | qwerTYUI |
| △△△△ | employee2 | asdfGHJK |
| ... | ... | ... |

DEVICE ADMINISTRATION SYSTEM AND DEVICE

CROSS REFERENCE TO RELATED APPLICATION

The present application claims priority from Japanese Patent Application No. 2014-135162, which was filed on Jun. 30, 2014, the disclosure of which is herein incorporated by reference in its entirety.

BACKGROUND

Technical Field

The following disclosure relates to a device administration system and a device.

Description of the Related Art

There is known an image processing system in which a multi-function peripheral (MFP), an authentication server, and a plurality of service servers are connected to each other over a network. In this image processing system, upon authenticating login information, such as a user ID, received from the MFP, the authentication server sends the MFP a menu screen for a service, of which use is permitted for a user identified by the login information.

SUMMARY

In this image processing system, the MFP receives information about the menu screen from the authentication server on condition that the MFP transmits the login information to the authentication server. Accordingly, the MFP cannot receive the information about the menu screen from the authentication server before transmission of the login information.

Accordingly, an aspect of the disclosure relates to a device and a device administration system capable of appropriately restricting use of a function of the device.

In one aspect of the disclosure, a device administration system includes: a particular device including a storage and a device controller, the particular device being configured to perform a plurality of functions; and a first server including a first controller. The first controller of the first server is configured to execute: transmitting restriction information and first destination information to the particular device without a request from the particular device. The restriction information is for placing particular restriction on a particular function that is one of the plurality of functions. The device controller of the particular device is configured to execute: receiving the restriction information and the first destination information transmitted from the first server; placing the particular restriction on the particular function corresponding to the received restriction information; storing the received first destination information into the storage; accepting input of authentication information; transmitting the inputted authentication information to a destination device indicated by the first destination information stored in the storage; receiving permission information from the destination device; and upon receiving the permission information, canceling the particular restriction on the particular function.

In another aspect of the disclosure, a device includes: a storage; and a controller. The device is configured to perform a plurality of functions. The controller is configured to execute: receiving restriction information and first destination information transmitted from a first server connected to the device without a request to the first server, the restriction information being for placing particular restriction on a particular function that is one of the plurality of functions; placing the particular restriction on the particular function corresponding to the received restriction information; storing the received first destination information into the storage; accepting input of the authentication information; transmitting the inputted authentication information to a destination device indicated by the first destination information stored in the storage; receiving permission information from the destination device; and upon receiving the permission information, canceling the particular restriction on the particular function.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIGS. 2A and 2B are tables illustrating examples of a device administration table and an authentication-information administration table;

DETAILED DESCRIPTION OF THE EMBODIMENTS

Figure 1:
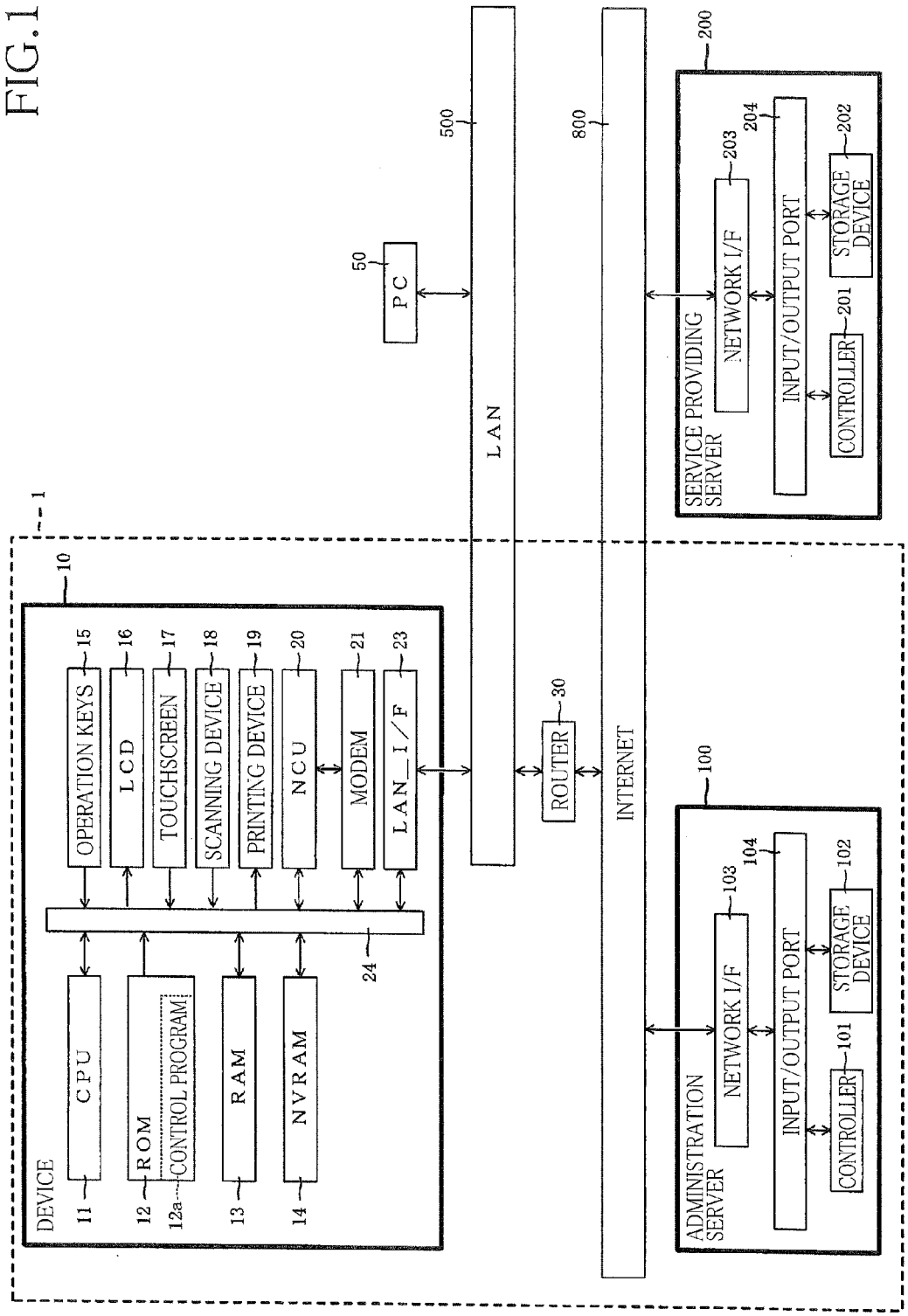
FIG. 1 is a block diagram illustrating one example of a configuration of a device administration system.

Hereinafter, there will be described embodiments by reference to the drawings. First, a first embodiment will be explained with reference to FIGS. 1-7. FIG. 1 illustrates a device administration system 1 as one example of a device administration system according to one embodiment.

The device administration system 1 includes a device 10 and an administration server 100. In the device administration system 1, the device 10 cooperates with the administration server 100 to receive various kinds of services provided by a service providing server 200. In the present embodiment, the device 10 is a multi-function peripheral (MFP) having various kinds of functions such as a printing function, a scanning function, a copying function, and a facsimile function.

The device 10 includes a CPU 11, a ROM 12, a RAM 13, an NVRAM 14, operation keys 15, a liquid crystal display (LCD) 16, a touchscreen 17, a scanning device 18, a printing device 19, an NCU 20, a modem 21, and a local area network (LAN) interface 23. These devices are connected to each other by an input/output port 24.

The CPU 11 controls the functions of the device 10 and the devices connected to the input/output port 24, according to programs and data stored in the ROM 12, the RAM 13, and the NVRAM 14 or various kinds of signals transferred via the NCU 20. The ROM 12 is a read-only memory which stores (i) various kinds of programs to be executed by the CPU 11 and (ii) constants and tables to be referred by the CPU 11 during execution of the programs. The ROM 12 stores, e.g., a control program 12a for controlling operations of the device 10. Processing (which will be described below) illustrated in FIGS. 3A-4B and FIGS. 6A-7 are executed by the CPU 11 according to the control program 12a.

The RAM 13 is a rewritable transitory memory having a temporary area which temporarily stores various kinds of data during execution of the control program 12a by the CPU 11. The NVRAM 14 is a non-transitory RAM. The operation keys 15 are mechanical keys provided on a housing of the device 10 and accept various kinds of setting values and instructions provided by a user. The LCD 16 displays various kinds of screens. The touchscreen 17 is superposed on a screen surface of the LCD 16. The touchscreen 17 detects an input object, such as a finger or a stylus, having contacted or approached the screen of the LCD 16 and inputs the detected position to the device 10.

The scanning device 18 reads a document to create image data. The printing device 19 prints an image on a recording sheet based on print data. The modem 21 upon facsimile transmission converts image data to be transmitted, into a signal transmittable to a telephone network, not shown, and transmits the signal to the telephone network via the NCU 20. Also, the modem 21 receives a signal from the telephone network via the NCU 20 to decode the signal into image data. The NCU 20 controls connection of the device 10 to the telephone network, not shown, by connecting or disconnecting a network with an exchange on the telephone network. The LAN interface 23 is an interface for the device 10 to perform communication via a local area network (LAN) 500.

The device 10 is connected to a router 30 via the LAN 500. The device 10 is connected to the Internet 800 via the router 30. The device 10 is connected to a personal computer (PC) 50 via the LAN 500. A driver program (hereinafter referred to as "driver") for use of a function of the device 10 may be installed on the PC 50. The PC 50 on which the driver is installed can use the corresponding function of the device 10. For example, the PC on which a printer driver for use of the printing function is installed can transmit a print job containing print data created by the printer driver, to the device 10 to cause the device 10 to print an image based on the print data.

The administration server 100 is a server which manages or administers the device 10 which receives services provided by the service providing server 200. The administration server 100 also serves as a relay server which relays communication between the device 10 and the service providing server 200. Any device having a well-known server function may be used as the administration server 100. The administration server 100 includes a controller 101, a storage device 102, and a network interface 103. These devices are connected to each other by an input/output port 104.

The controller 101 constitutes a computer and includes a CPU, not shown, and a ROM and a RAM, not shown, electrically connected to the CPU. The CPU controls operations of the administration server 100 according to programs and data stored in the ROM and the storage device 102. The storage device 102 is a non-transitory storage device. The storage device 102 is a hard disc drive, for example.

The storage device 102 stores various kinds of programs for controlling operations of the administration server 100. Examples of the programs include programs which are executed by the controller 101 to execute processings illustrated in FIGS. 3A, 3B, and 5. The storage device 102 stores a device administration table 121 (see FIG. 2A) for managing the device 10 as a client.

The network interface 103 is a device for the administration server 100 to communicate with other devices connected to the Internet 800. A well-known network card may be used as the network interface 103. The administration server 100 is connected to the Internet 800 via the network interface 103.

The service providing server 200 is a server provided by a service provider and provides various services to clients such as the device 10. The service providing server 200 also serves as an authentication information administration server configured to manage authentication information. In the present embodiment, the service providing server 200 is capable of limiting or restricting execution of the function of the device 10 as a client via the administration server 100. For example, the service providing server 200 is capable of restricting execution or performing of the printing function of the device 10.

In the following explanation, restricting the execution of the function may be hereinafter referred to simply as "restricting the function" or "function restriction", for example. In the following description, restriction of the execution of the printing function is explained, by way of example, as the function restriction imposed on the device 10 by the service providing server 200. The restriction of the execution of the printing function by the service providing server 200 may be hereinafter referred to as "PC print restriction".

Any device having a well-known server function may be used as the service providing server 200. The service providing server 200 includes a controller 201, a storage device 202, and a network interface 203. These devices are connected to each other by an input/output port 204. The controller 201 constitutes a computer and includes a CPU, not shown, and a ROM and a RAM, not shown, electrically connected to the CPU. The CPU controls operations of the service providing server 200 according to programs and data stored in the ROM and the storage device 202.

The storage device 202 is a non-transitory storage device. The storage device 202 is a hard disc drive, for example. The storage device 202 stores various kinds of programs for controlling operations of the service providing server 200. Examples of the programs include programs which are executed by the controller 201 to execute processings illustrated in FIGS. 3A-4B. The storage device 202 stores an authentication-information administration table 221 (see FIG. 2B) which manages authentication information for removing or canceling the function restriction set by the service providing server 200 (this authentication information may be hereinafter referred to as "server authentication information").

The network interface 203 is a device for the service providing server 200 to communicate with other devices connected to the Internet 800. A well-known network card may be used as the network interface 203. The service providing server 200 is connected to the Internet 800 via the network interface 203.

The device 10 and the administration server 100 communicate with each other according to a protocol for establishing connection, more specifically, Extensible Messaging and Presence Protocol Over Bidirectional-Streams Over Synchronous HTTP (XMPP over BOSH). XMPP over BOSH is a protocol for continuous connection or for maintaining connection which almost always keeping a state in which connection is established. The device 10 and the service providing server 200 communicate with each other according to Hyper text Transfer Protocol (HTTP).

The device 10 is connected to the Internet 800 via the router 30. In communication according to a protocol which is not the protocol for establishing connection, the router 30 allows passage of a response to information transmitted from the device 10 toward the Internet 800 but disallows passage of information, other than the response, which is transmitted from the Internet 800 to the device 10. The service providing server 200 communicating with the device 10 according to HTTP cannot transmit information to the device 10 unless the service providing server 200 receives information from the device 10.

Since the device 10 and the administration server 100 communicate with each other according to the protocol for establishing connection, on the other hand, the device 10 can receive information generated on the Internet 800 and transmitted by the administration server 100 to the device 10 via the router 30.

FIG. 2A illustrates one example of the device administration table 121. In this device administration table 121, a device ID 121b, a restriction status 121c, an authentication URL 121d, a result notification URL 121e, and a setting status 121f are associated with an owner ID 121a.

The owner ID 121a identifies an owner of the device 10 as the client. The device ID 121b indicates the device 10 to be managed. A pair of the owner ID 121a and the device ID 121b are stored into the device administration table 121 when the device 10 is registered into the administration server 100 as a device which uses a service provided by the service providing server 200.

The restriction status 121c indicates a status of a function restriction, set by the service providing server 200, for each of the devices 10. In the example illustrated in FIG. 2A, the restriction status 121c indicates a status of the PC print restriction for each of the devices 10. Information indicating "ON" (hereinafter referred to as "ON information") is stored as the restriction status 121c for the device 10 for which the PC print restriction is to be set. Information indicating "OFF" (hereinafter referred to as "OFF information") is stored as the restriction status 121c for the device 10 for which the PC print restriction is not to be set.

The initial value of the restriction status 121c for each of the devices 10 is the OFF information. When the administration server 100 receives, from the service providing server 200, information for restricting the function of the device 10 (hereinafter may be referred to as "restriction information"), the ON information is stored as the restriction status 121c for the device 10. When the administration server 100 receives, from the service providing server 200, information for removing the function restriction set for the device 10, the OFF information is stored as the restriction status 121c for the device 10.

The authentication URL 121d is a URL indicating a destination of transmission of the authentication information which is input into the device 10 by the user to remove the function restriction. In the example illustrated in FIG. 2A, the authentication URL 121d indicates a destination of transmission of the authentication information for removing the PC print restriction. In the case where the restriction status 121c is the OFF information, that is, the function restriction is not to be set for the device 10, the initial value, e.g., zero, is stored as the authentication URL 121d.

The result notification URL 121e is a URL indicating a destination of transmission of information that indicates a result of execution of the function by the device 10 (hereinafter may be referred to as "result information"). In the example illustrated in FIG. 2A, in the case where the device 10 uses the printing function to perform printing, the result notification URL 121e indicates a destination of transmission of result information about the printing (hereinafter may be referred to as "print result information"). Examples of the print result information include the number of printed sheets, the size of the printed sheets, and information indicating color printing or black and white printing.

The setting status 121f indicates a status of setting of the function restriction for each of the devices 10. In the case where the administration server 100 receives the restriction information from the service providing server 200, and the function restriction is set for the device 10 according to the restriction information, information indicating that the function restriction according to the restriction information has been set (hereinafter may be referred to as "set information") is stored as the setting status 121f for the device 10.

In the case where the administration server 100 receives the restriction information from the service providing server 200, but the function restriction according to the restriction information has not been set for the device 10 due to, e.g., failure in communication with the device 10, information indicating that the function restriction according to the restriction information has not been set (hereinafter may be referred to as "unset information") is stored as the setting status 121f for the device 10.

When the restriction status 121c is the OFF information, that is, the function restriction is not to be set for the device 10, the initial value, e.g., zero is set for the authentication URL 121d, the result notification URL 121e, and the setting status 121f.

FIG. 2B illustrates one example of the authentication-information administration table 221. In this authentication-information administration table 221, a user name 221a, a user ID 221b, and a password 221c are associated with each other. A set of the user name 221a, the user ID 221b, and the password 221c stored in the authentication-information administration table 221 are ones which are input into the service providing server 200 at user registration for a corresponding service. The server authentication information is constituted by a pair of the user ID 221b and the password 221c associated in the authentication-information administration table 221.

Figure 3A:
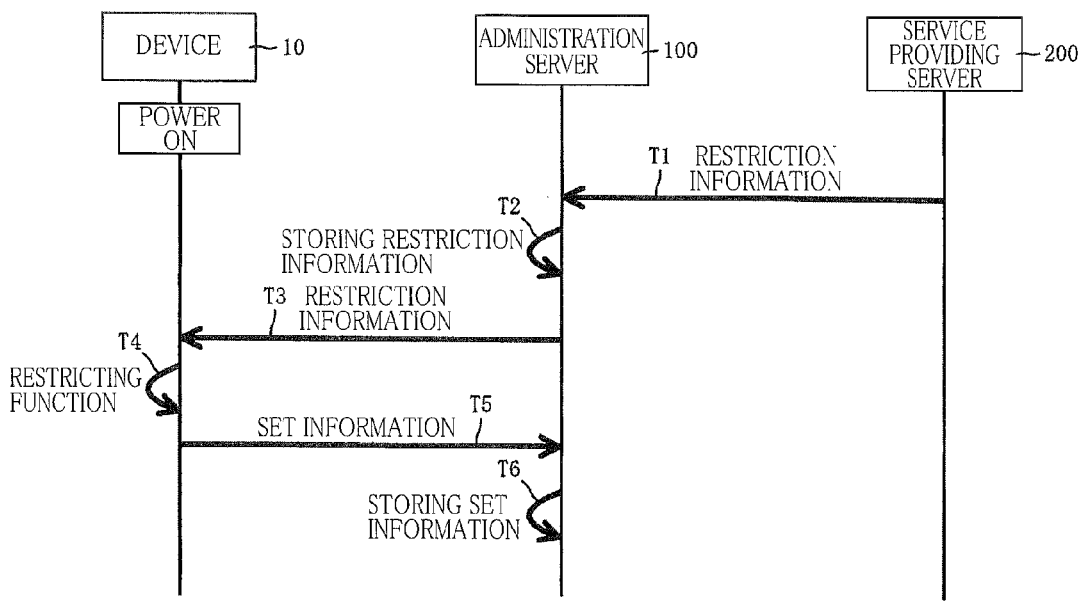
FIGS. 3A and 3B are sequence diagrams illustrating operations of devices.
Figure 3B:
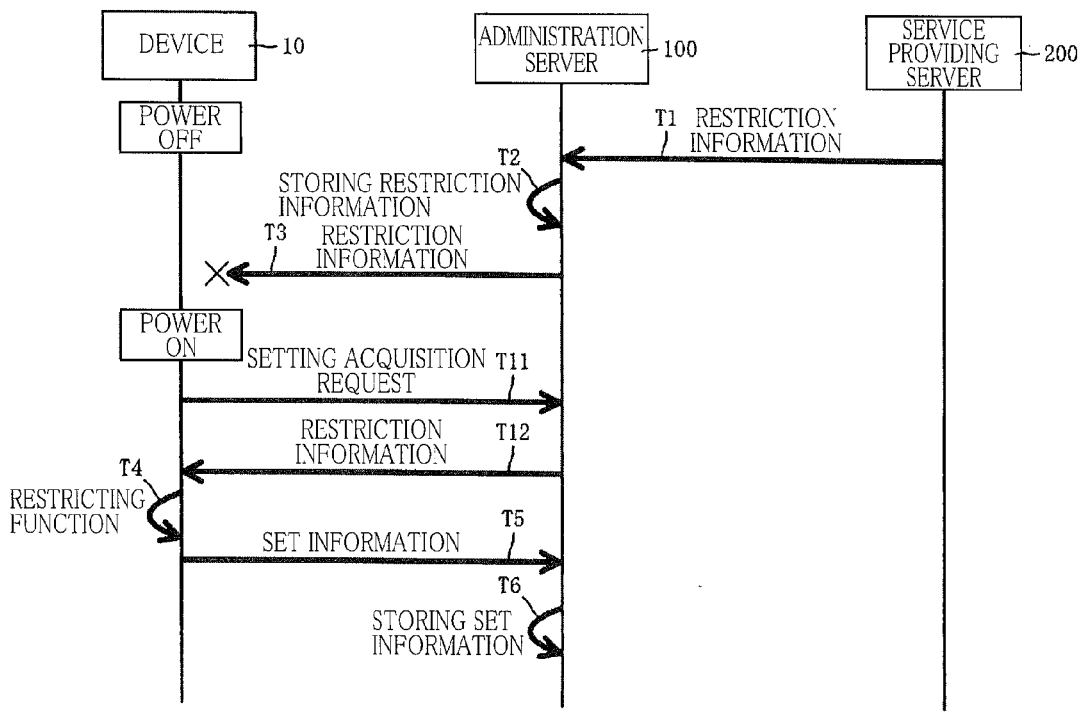

There will be next explained, with reference to FIGS. 3A and 3B, how the device 10, the administration server 100, and the service providing server 200 are operated when the restriction information for restricting the function of the device 10 is transmitted from the service providing server 200. FIG. 3A illustrates the case where a power source of the device 10 is ON at transmission of the restriction information from the service providing server 200 to the device 10.

When instructed to impose the function restriction on the device 10, the service providing server 200 at T1 transmits a request of the function restriction, the restriction information, the device ID, the authentication URL, and the result notification URL. The device 10 as a destination of transmission of the request is selected from a list of devices acquired from the administration server 100 by the service providing server 200. In the present embodiment, each of the authentication URL and the result notification URL is a URL indicating a particular storage location on the service providing server 200. Upon reception of information such as the restriction information from the service providing server 200, the administration server 100 at T2 updates the device administration table 121 based on the received information.

Specifically, the administration server 100 stores the received authentication URL and the received result notification URL respectively as the authentication URL 121*d* and the result notification URL 121*e* which correspond to the device ID 121*b* indicating the received device ID among the device IDs 121*b* stored in the device administration table 121. The administration server 100 stores the ON information as the restriction status 121*c* corresponding to the received device ID. The administration server 100 stores the unset information as the setting status 121*f* corresponding to the received device ID.

The administration server 100 at T3 transmits the restriction information, the authentication URL, and the result notification URL to the device 10 identified by the device ID. The device 10 at T4 sets the function restriction according to the restriction information received from the administration server 100. In the present embodiment, the device 10 sets the PC print restriction according to the restriction information received from the administration server 100. The device 10 also stores, into the RAM 13, the authentication URL and the result notification URL received from the administration server 100.

The device 10 at T5 transmits the device ID, the restriction information, and the set information associated with the device 10, to the administration server 100. Upon reception of the set information, the administration server 100 at T6 changes the setting status 121*f* associated with the received device ID among the device IDs 121*b* stored in the device administration table 121, from the unset information to the set information.

FIG. 3B illustrates the case where the power source of the device 10 is OFF at transmission of the restriction information from the service providing server 200 to the device 10. The processings T1-T3 and T4-T6 in FIG. 3A are executed also in this case, and an explanation of which is dispensed with. However, the restriction information transmitted from the administration server 100 at T3 indicates that the power source of the device 10 identified by the device ID is OFF, and thus this restriction information is not received by the device 10.

When the power source is turned on, the device 10 at T11 transmits a setting acquisition request and the device ID of the device 10 to the administration server 100. Upon reception of the setting acquisition request, the administration server 100 refers to the device administration table 121, and when the setting status 121*f* corresponding to the received device ID is the unset information, the administration server 100 at T12 transmits the restriction information to the device 10. The administration server 100 at T12 transmits, to the device 10, the restriction information and values of the authentication URL 121*d* and the result notification URL 121*e* corresponding to the received device ID. The device 10 at T4 sets the function restriction based on the restriction information received at T12 from the administration server 100.

Figure 4A:
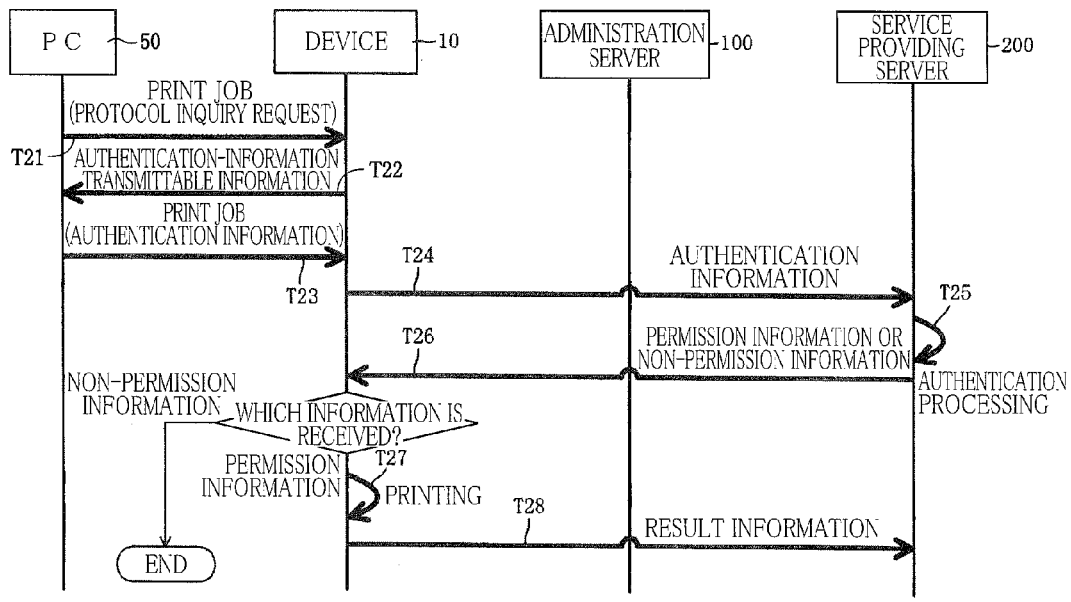
FIGS. 4A and 4B are sequence diagrams illustrating operations of devices.

There will be next explained, with reference to FIG. 4, how the PC 50, the device 10, and the service providing server 200 are operated when the PC 50 performs printing using the device 10 for which the PC print restriction is set. FIG. 4A illustrates the case where the PC 50 and the device 10 at first communicate with each other according to a secure protocol, i.e., a protocol using a cryptographic technology. In the present embodiment, Internet Printing Protocol Security (IPPS) is used as the secure protocol by way of example.

When the PC 50 accepts an instruction for causing the device 10 to print an image based on data selected as data to be printed (hereinafter may be referred to as print target data), the PC 50 at T21 sends the device 10 a print job created by the printer driver installed on the PC 50. The print job transmitted at T21 contains print data and print parameters created based on the print target data. A header of the print job contains an inquiry about protocol (hereinafter may be referred to as "protocol inquiry request").

Upon reception of the print job transmitted at T21, the device 10 determines whether the communications protocol between the PC 50 and the device 10 at the time of reception of this print job is the secure protocol (i.e., IPPS in the present embodiment) or not in accordance with the protocol inquiry request contained in the header of the received print job. When the device 10 determines that the communications protocol between the PC 50 and the device 10 is IPPS, the device 10 at T22 sends the PC 50 information indicating that the device 10 can transmit the authentication information (hereinafter may be referred to as "authentication-information transmittable information").

Upon reception of the authentication-information transmittable information, the PC 50 at T23 sends the device 10 a print job whose header contains the authentication information. The printer driver of the PC 50 controls a display device of the PC 50 to display a screen which prompts a user to input the authentication information. The printer driver accepts the authentication information input to the screen. The authentication information is constituted by a pair of the user ID and the password. The printer driver creates a print job whose header contains the received authentication information, and the PC 50 at T23 transmits the created print job to the device 10. In the present embodiment, the print data is contained in the print job transmitted at T21, and thus the print job transmitted at T23 does not contain the print data.

The device 10 at T24 sends the service providing server 200 the authentication information contained in the print job received at T23. Specifically, the device 10 transmits the user ID and the password as the authentication information stored in the RAM 13, to the authentication URL which is received from the administration server 100 with the restriction information.

The service providing server 200 at T25 executes an authentication processing for the received authentication information. Specifically, when the server authentication information coinciding with the received authentication information (i.e., the user ID and the password) is stored in the authentication-information administration table 221, the service providing server 200 determines that the received authentication information can be authenticated. When the server authentication information coinciding with the received authentication information is not stored into the authentication-information administration table 221, the service providing server 200 determines that the received authentication information cannot be authenticated.

The service providing server 200 at T26 sends the device 10 information based on a result of the authentication processing executed at T25. Specifically, when the service providing server 200 at T25 determines that the authentication information received from the device 10 can be authenticated, the service providing server 200 sends the device 10 information for permitting removal of the function restriction (hereinafter may be referred to as "permission information"). When the service providing server 200 at T25 that the authentication information received from the device 10 cannot be authenticated, the service providing server 200 sends the device 10 information for not permitting removal of the function restriction (hereinafter may be referred to as "non-permission information").

When the device 10 receives the permission information from the service providing server 200, the device 10 at T27 controls the printing device 19 to print an image based on the print data received from the PC 50. The device 10 at T28 transmits result information about the printing at T27 to the service providing server 200. In the present embodiment, the print result information contains the number of printed sheets, the size of the printed sheets, and information indicating color printing or black and white printing.

Specifically, the device 10 at T28 transmits the print result information stored in the RAM 13, to the result notification URL which is received from the administration server 100 with the restriction information. The result information transmitted from the device 10 at T28 is stored into a storage location specified by the result notification URL, e.g., the storage device 202 of the service providing server 200. When the device 10 receives the non-permission information from the service providing server 200, this flow ends without printing.

Figure 4B:
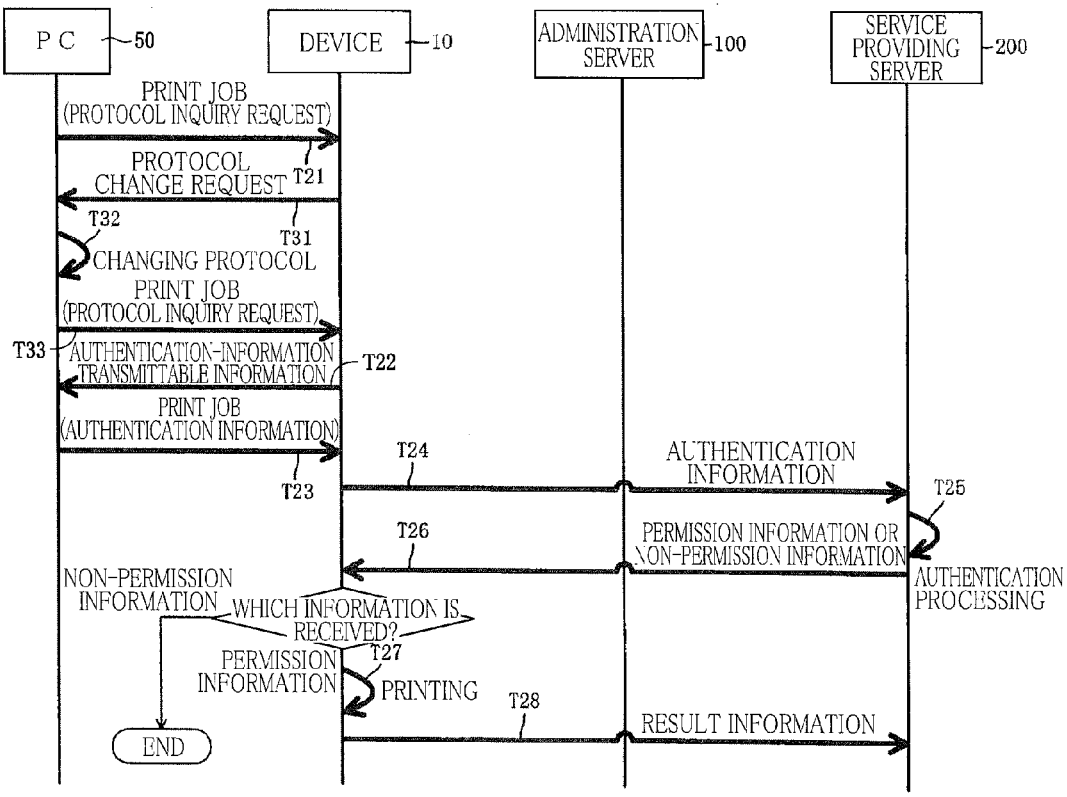

FIG. 4B illustrates the case where the PC 50 and the device 10 at first communicate with each other according to a protocol different from the secure protocol. The processings T21, and T22-T28 in FIG. 4A are executed also in this case, and an explanation of which is dispensed with. When the device 10 determines that the communications protocol between the PC 50 and the device 10 is not IPPS in accordance with the protocol inquiry request contained in the print job received at T21, the device 10 at T31 sends the PC 50 a request for changing the communications protocol to the secure protocol (hereinafter may be referred to as "protocol change request").

Upon reception of the protocol change request, the PC 50 at T32 changes the communications protocol between the PC 50 and the device 10 to IPPS in response to the request. When the communications protocol is changed to IPPS, the PC 50 at T33 transmits a print job containing the protocol inquiry request, to the device 10 as in the processing at T21. Like the print job transmitted at T21, the print job transmitted at T33 contains the print data and the print parameters created based on the print target data. Since the print data and the print parameters have been transmitted to the device 10 at T21, the print job transmitted at T33 may be a print job which contains the protocol inquiry request but does not contain the print data and the print parameters.

The device 10 determines whether the communications protocol between the PC 50 and the device 10 is IPPS or not in accordance with the protocol inquiry request contained in the print job received at T33. Since the communications protocol between the PC 50 and the device 10 has been changed to IPPS at T32, the device 10 determines that the communications protocol between the PC 50 and the device 10 is IPPS and at T22 transmits the authentication-information transmittable information to the PC 50.

Figure 5:
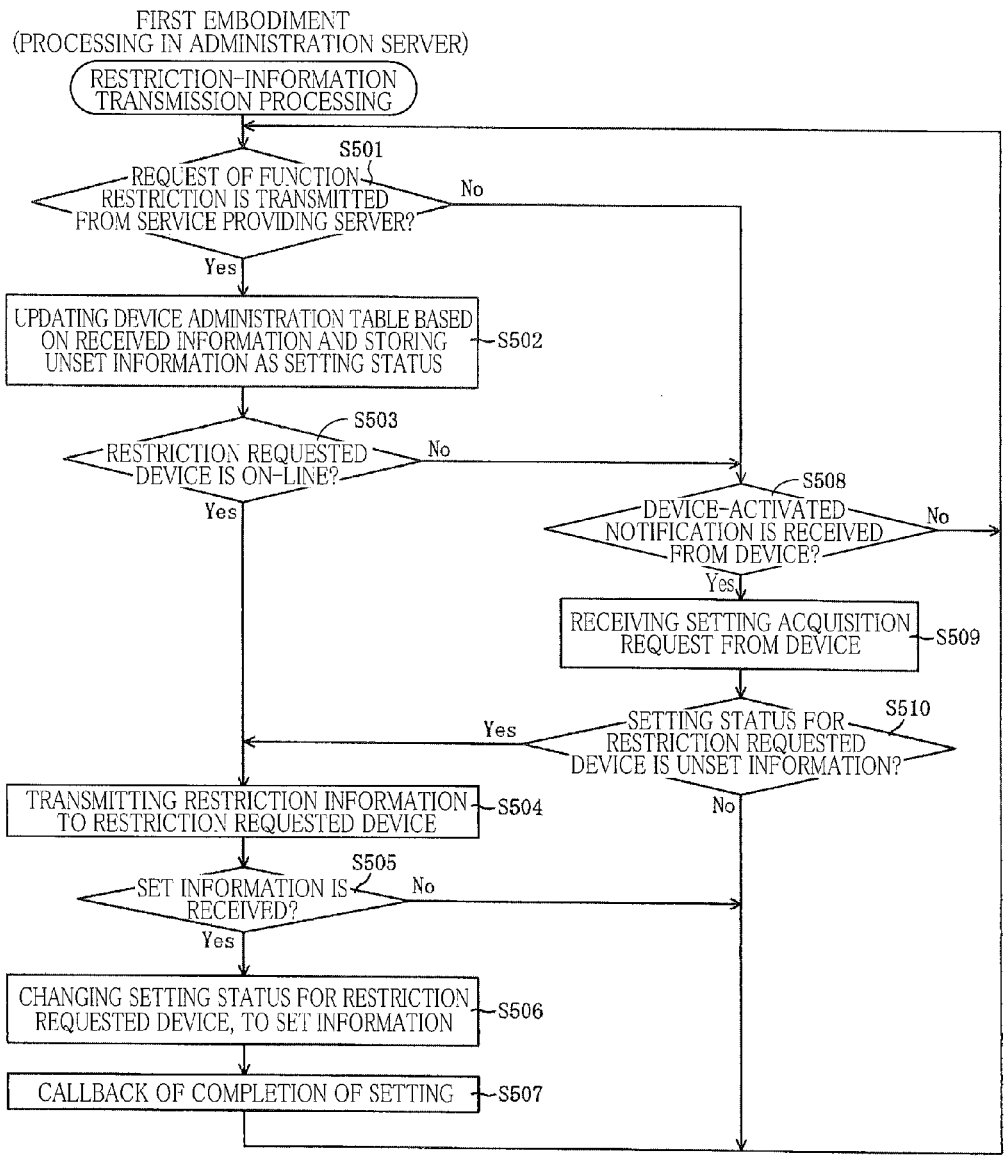
FIG. 5 is a flow chart illustrating a restriction-information transmission processing executed by an administration server.

FIG. 5 is a flow chart illustrating a flow of a restriction-information transmission processing which is executed by the controller 101 of the administration server 100. This flow begins when the administration server 100 is turned on. The controller 101 waits for a request of function restriction transmitted from the service providing server 200 or a device-activated notification transmitted from the device 10 (S501: No, S508: No). When the administration server 100 receives the request of the function restriction from the service providing server 200 (S501: Yes), the controller 101 at S502 updates the device administration table 121 in accordance with information which is received with the request of the function restriction.

Specifically, the controller 101 at S502 stores the ON information, the received authentication URL, and the received result notification URL into the restriction status 121c, the authentication URL 121d, and the result notification URL 121e corresponding to the received device ID, respectively. Also, the controller 101 at S502 stores the unset information as the setting status 121f corresponding to the received device ID. The processing at S502 corresponds to the processing T2 in the sequence diagrams in FIGS. 3A and 3B.

The controller 101 at S503 determines whether the device 10 for which the function restriction is requested is on-line or not. The device for which the function restriction is requested may be hereinafter referred to as "restriction requested device". When the controller 101 determines that the restriction requested device 10 is on-line (S503: Yes), this flow goes to S504.

In a processing at S504 executed when the positive decision (Yes) is made at S503, the controller 101 transmits the restriction information, and the authentication URL and the result notification URL received from the service providing server 200, to the device 10 identified by the received device ID, i.e., the restriction requested device. The processing at S504 executed when the positive decision (Yes) is made at S503 corresponds to the processing at T3 in the sequence diagrams in FIGS. 3A and 3B.

As a result of the processing at S504, the restriction requested device 10 sets the function restriction based on the restriction information transmitted at S504. After the processing at S504, the controller 101 at S505 determines whether the administration server 100 receives the set information from the restriction requested device 10 or not. A positive decision (Yes) is made at S505 when the administration server 100 receives the set information from the restriction requested device 10 within a predetermined period, e.g., five minutes, after the processing at S504. A negative decision (No) is made at S505 (S505: No), this flow returns to S501.

A positive decision (Yes) is made at S505 (S505: Yes), the controller 101 at S506 changes the setting status 121f, which is stored in the device administration table 121 and corresponds to the device ID received with the set information, from the unset information to the set information. The processing at S506 corresponds to the processing at T6 in the sequence diagrams in FIGS. 3A and 3B. After the processing at S506, the controller 101 at S507 makes, to the service providing server 200, a callback of information indicating completion of setting of the function restriction in the restriction requested device 10, and this flow returns to S501. It is noted that a URL to which the callback is made at S507 is contained in the request of the function restriction, and when the request of the function restriction is received, the URL is stored in association with the device ID received with the request.

When the controller 101 at S503 determines that the restriction requested device 10 is not on-line, that is, the restriction requested device 10 is off-line (S503: No), the controller 101 at S508 determines whether the controller 101 receives the device-activated notification from the restriction requested device 10 or not. When the controller 101 at S508 determines that the controller receives the device-activated notification from the restriction requested device 10 (S508: Yes), the controller 101 at S509 receives the setting acquisition request that is transmitted, after the reception of the device-activated notification, from the restriction requested device 10 having transmitted the device-activated notification. In the present embodiment, the state in which the device 10 is off-line indicates that the power source of the device 10 is OFF.

The controller 101 at S510 refers to the device administration table 121 to determine whether the setting status 121*f* corresponding to the device ID received with the setting acquisition request indicates the unset status or not. When the controller determines that the setting status 121*f* is not the unset information, that is, the setting status 121*f* is the set information (S510: No), this flow returns to S501.

When the controller 101 determines that the setting status 121*f* is the unset information (S510: Yes), this flow goes to S504. In the processing at S504 executed when the positive decision (Yes) is made at S510, the controller 101 transmits the restriction information and values of the authentication URL 121*d* and the result notification URL 121*e* corresponding to the setting status 121*f* indicating the unset information (i.e., the authentication URL and the result notification URL), to the restriction requested device 10. The processing at S504 executed when the positive decision (Yes) is made at S510 corresponds to the processing at T12 in the sequence diagram in FIG. 3B.

Figure 6A:
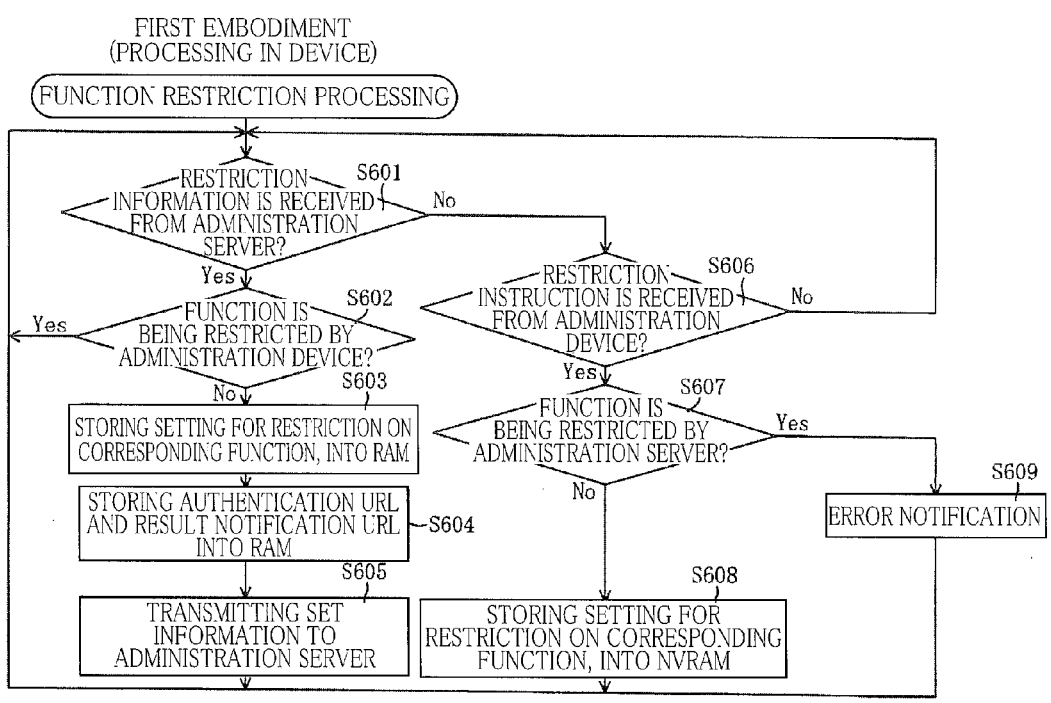
FIG. 6A is a flow chart illustrating a function restriction processing executed by a device.

FIG. 6A is a flow chart illustrating a flow of a function restriction processing which is executed by the CPU 11 of the device 10. This processing begins after execution of a device turning-on processing which will be described later with reference to FIG. 6B, and this processing is repeated while the power source of the device 10 is ON.

The CPU 11 waits for the restriction information transmitted from the administration server 100 or an instruction for restricting the function of the device 10 (hereinafter may be referred to as "restriction instruction"), which is transmitted from an administration device of the device 10 (S601: No, S606: No). In the present embodiment, a Web server is integrated in the device 10. The administration device is, for example, a personal computer capable of accessing the Web server integrated in the device 10.

The administration device is connected to the device 10 over the LAN 500. Like the service providing server 200, the administration device can transmit the restriction instruction to the device 10 to restrict the execution of the function by the device 10. In the present embodiment, it is assumed that the function restriction set to the device 10 by the administration device is the restriction of the execution of the printing function by the device. A plurality of the administration devices may be provided.

Upon reception of the restriction information from the administration server 100 (S601: Yes), the device 10 at S602 determines whether the function to be restricted based on the received restriction information is being restricted by the administration device for the device 10 or not. Specifically, a positive decision (Yes) is made at S602 when the NVRAM 14 stores a setting of the function restriction, which is based on the restriction instruction received from the administration device, for the function to be restricted according to the restriction information received from the administration server 100. When the positive decision (Yes) is made at S602 (S602: Yes), this flow returns to S601.

When a negative decision (No) is made at S602 (S602: No), the CPU 11 at S603 stores a setting for restriction of the corresponding function, into the RAM 13 according to the restriction information received from the administration server 100. As a result of the processing at S603, the function restriction based on the restriction information received from the administration server 100 is set. The processing at S603 corresponds to the processing at T4 in the sequence diagrams in FIGS. 3A and 3B.

The CPU 11 at S604 stores, into the RAM 13, the authentication URL and the result notification URL received with the restriction information. The CPU 11 at S605 transmits the set information to the administration server 100 with the restriction information and the device ID of the device 10, and this flow returns to S601. The processing at S605 corresponds to the processing at T5 in the sequence diagrams in FIGS. 3A and 3B. As a result of the processing at S605, the administration server 100 having received the set information changes the corresponding setting status 121*f* of the device administration table 121, from the unset information to the set information.

When the device 10 receives the restriction instruction from the administration device connected to the device 10 (S606: Yes), the device 10 at S607 determines whether the function to be restricted based on the received restriction instruction is being restricted by the administration server 100 or not. Specifically, a positive decision (Yes) is mage at S607 when the RAM 13 stores a setting of the function restriction, which is based on the restriction information received from the administration server 100, for the function to be restricted based on the restriction instruction received from the administration device.

When a positive decision (Yes) is made at S607, the CPU 11 at S609 transmits an error notification to the administration device, and this flow returns to S601. When a negative decision (No) is made at S607 (S607: No), the CPU 11 at S608 stores the setting for restriction of the corresponding function, into the NVRAM 14 according to the restriction instruction received from the administration device. As a result of the processing at S608, the function restriction based on the restriction instruction received from the administration device is set.

Figure 6B:
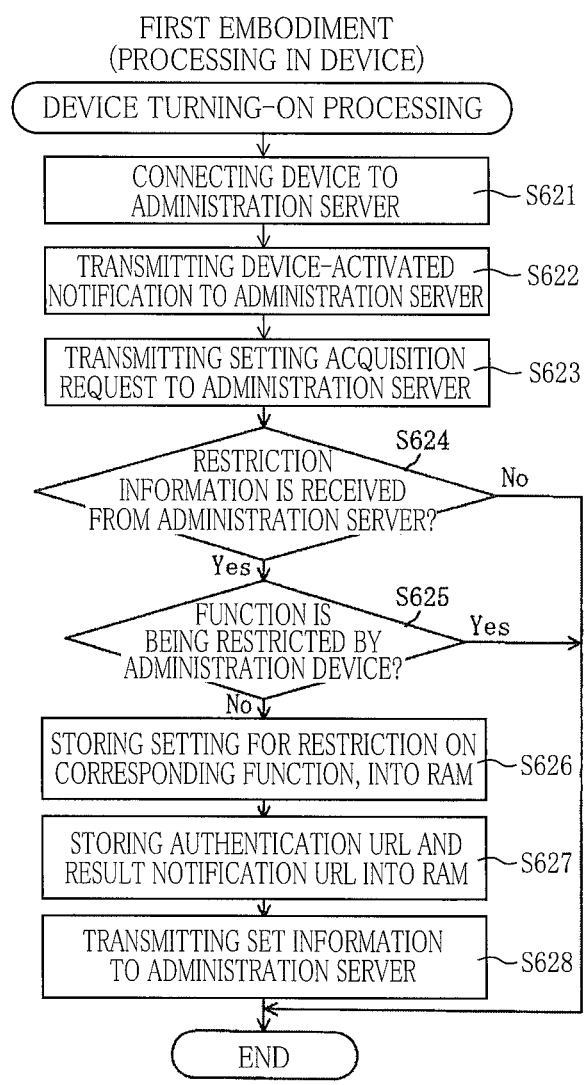
FIG. 6B is a flow chart illustrating a device turning-on processing.

FIG. 6B is a flow chart illustrating a flow of the device turning-on processing which is executed by the CPU 11 of the device 10. This flow begins when the device 10 is turned on. The CPU 11 at S621 connects the device 10 to the administration server 100 according to the protocol for establishing connection. The CPU 11 at S622 transmits the device-activated notification to the administration server 100. The CPU 11 at S623 transmits the setting acquisition request to the administration server 100. The processing at S623 corresponds to the processing at T11 in the sequence diagram in FIG. 3B.

The CPU 11 at S624 determines whether the device 10 receives the restriction information from the administration server 100 or not. A positive decision (Yes) is made at S624 when the device 10 receives the restriction information from the administration server 100 within a predetermined period, e.g., five minutes, after the transmission of the setting acquisition request to the administration server 100 at S623. When a negative decision (No) is made at S624 (S624: No), this flow ends.

When a positive decision (Yes) is made at S624 (S624: Yes), the CPU 11 at S625 executes a processing similar to that at S602, that is, the CPU 11 determines whether the function to be restricted based on the received restriction information is being restricted by the administration device for the device 10 or not. When a positive decision (Yes) is made at S625 (S625: Yes), this flow ends. When a negative decision (No) is made at S625 (S625: No), the CPU 11 executes processings at S626-S628 as in the processing at S603-S605, and this flow ends. The processings at S626 and S628 correspond to the respective processings at T4 and T5 in the sequence diagram in FIG. 3B.

Figure 7:
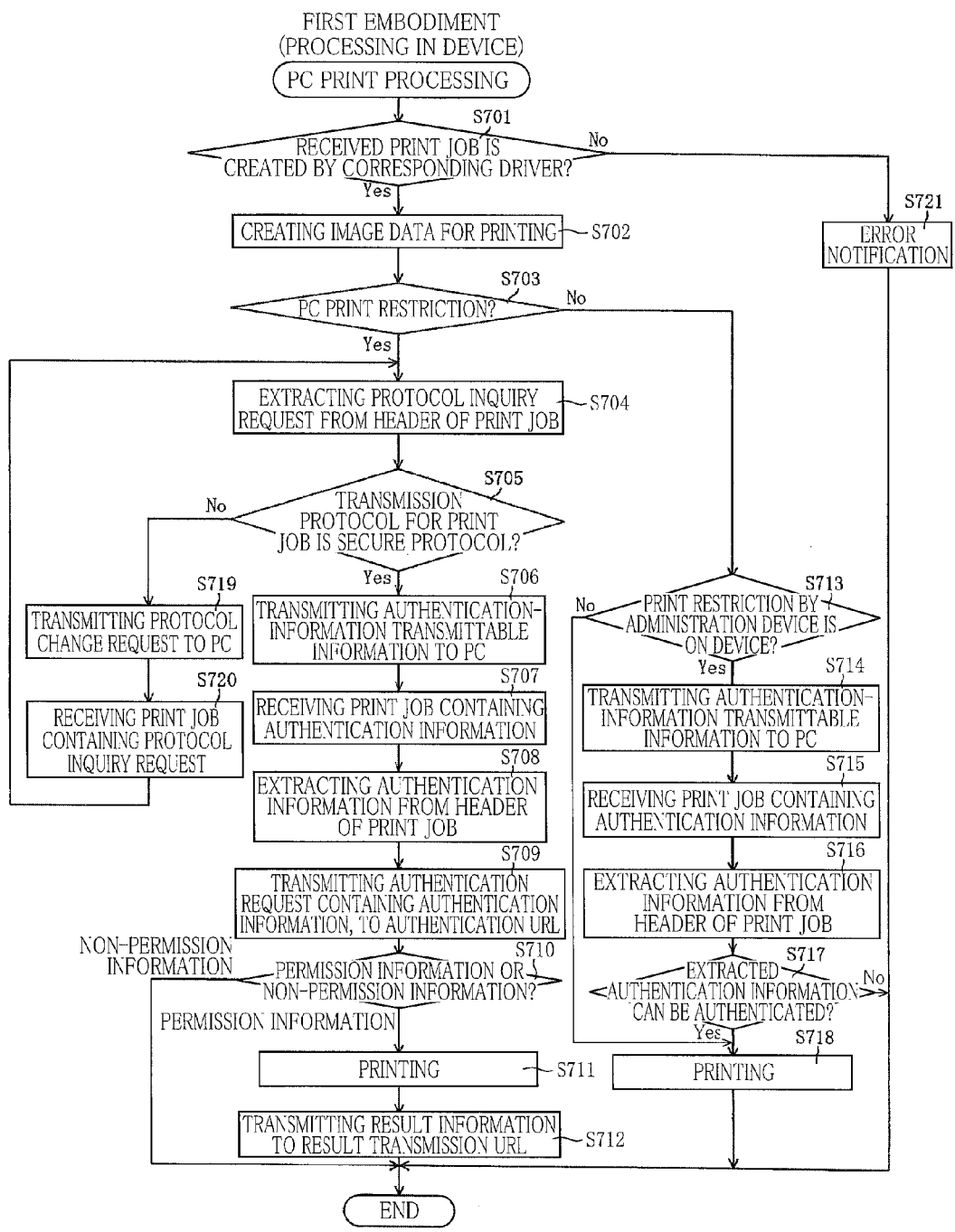
FIG. 7 is a flow chart illustrating a PC print processing executed by the device.

FIG. 7 is a flow chart illustrating a flow of a PC print processing which is executed by the CPU 11 of the device 10. This flow begins when the device 10 receives a print job from the PC 50 on condition that this processing is not being executed. The CPU 11 at S701 determines whether or not the received print job is a print job created by the driver corresponding to the device 10. When the CPU 11 determines that the received print job is not the print job created by the driver corresponding to the device 10 (S701: No), the CPU 11 at S721 transmits an error notification to the PC 50, and this flow ends. In the processings at S701 and S721, when the print job is not a job appropriate for removing the restriction imposed on the function, that is, the print job is a job which cannot contain the authentication information, the CPU 11 can notify the user of this information.

When the CPU 11 determines that the received print job is the print job created by the driver corresponding to the device 10 (S701: Yes), the CPU 11 at S702 uses print data and print parameters contained in the received print job to create image data, based on which the printing device 19 is to print an image on a recording sheet. The CPU 11 stores the image data created at S702, into the RAM 13.

The CPU 11 at S703 determines whether the PC print restriction is on the device 10 or not, that is, the CPU 11 determines whether restriction on the printing function has been set in the processing at S603 (FIG. 6A) or not. When the CPU 11 determines that the PC print restriction is on the device 10 (S703: Yes), the CPU 11 at S704 extracts a protocol inquiry request from a header of the received print job.

The CPU 11 at S705 determines whether a transmission protocol for the print job, i.e., the communications protocol between the PC 50 and the device 10 is the secure protocol (i.e., IPPS in the present embodiment) or not based on the extracted protocol inquiry request. When the CPU 11 determines that the transmission protocol for the print job is the secure protocol (S705: Yes), the CPU 11 at S706 transmits the authentication-information transmittable information to the PC 50. The processing at S706 corresponds to the processings at T22 in the sequence diagrams in FIGS. 4A and 4B.

As a result of the processing at S706, the PC 50 having received the authentication-information transmittable information sends the device 10 a print job whose header contains the authentication information (this processing corresponds to the processing at T23 in FIGS. 4A and 4B). The CPU 11 at S707 receives the print job containing the authentication information which is transmitted from the PC 50 in response to the transmission of the authentication-information transmittable information. The CPU 11 at S708 extracts the authentication information, specifically, the user ID and the password, from the header of the received print job. The CPU 11 at S709 transmits the authentication request containing the extracted authentication information, to the service providing server 200. Specifically, the CPU 11 transmits the authentication request containing the extracted authentication information, to the authentication URL which is received from the administration server 100 with the restriction information on the PC print restriction and stored in the RAM 13. The processing at S709 corresponds to the processings at T24 in the sequence diagrams in FIGS. 4A and 4B.

The CPU 11 at S710 determines whether information received from the service providing server 200 in response to the transmission of the authentication request is the permission information or the non-permission information. When the CPU 11 determines that the CPU 11 receives the permission information from the service providing server 200 (S710: permission information), the CPU 11 at S711 controls the printing device 19 to print an image based on the image data created at S702 and stored in the RAM 13. The processing at S711 corresponds to the processings at T27 in the sequence diagrams in FIGS. 4A and 4B.

The CPU 11 at S712 transmits the number of printed sheets, the size of the printed sheets, and information indicating color printing or black and white printing to the service providing server 200 as the print result information, and this flow ends. Specifically, the CPU 11 transmits the print result information to a result transmission URL which is received from the administration server 100 with the restriction information on the PC print restriction and stored in the RAM 13. The processing at S712 corresponds to the processings at T28 in the sequence diagrams in FIGS. 4A and 4B.

When the CPU 11 at S705 determines that the transmission protocol for the print job is not the secure protocol (S705: No), the CPU 11 at S719 transmits the protocol change request to the PC 50. The processing at S719 corresponds to the processing at T31 in the sequence diagram in FIG. 4B.

As a result of the processing at S719, the PC 50 having received the protocol change request changes the transmission protocol for the print job to the secure protocol (i.e., IPPS in the present embodiment) (this processing corresponds to the processing at T32 in FIG. 4B). The CPU 11 at S720 receives the print job containing the protocol inquiry request which is transmitted from the PC 50 in response to the transmission of the protocol change request. That is, the CPU 11 receives the print job transmitted by the PC 50 at T33 in FIG. 4B. When the CPU 11 receives the print job containing the protocol inquiry request, this flow returns to S704.

When the CPU 11 determines that the PC print restriction is not on the device 10 (S703: No), the CPU 11 at S713 determines whether print restriction imposed by the administration device is on the device 10 or not, that is, the CPU 11 determines whether the restriction on the printing function has been set in the processing at S608 (FIG. 6A). When the CPU 11 determines that the print restriction imposed by the administration device is not on the device 10 (S713: No), the CPU 11 at S718 controls the printing device 19 to print an image based on the image data created at S702 and stored in the RAM 13, and this flow ends.

When the CPU 11 determines that the print restriction imposed by the administration device is on the device 10 (S713: Yes), the CPU 11 executes processings at S714-S716 as in the processing at S706-S708. The CPU 11 executes the authentication processing for the authentication information extracted at S716. The NVRAM 14 stores a device-authentication-information administration table for managing authentication information for removing the function restriction set by the administration device (hereinafter may be referred to as "device authentication information"). The device authentication information is registered as needed in response to a registering operation of the user.

When device information coinciding with the authentication information extracted at S716 (i.e., the user ID and the password) is stored in the device-authentication-information administration table, the CPU 11 determines that the CPU 11 can authenticate the extracted authentication information. When the device information coinciding with the authentication information extracted at S716 is not stored in the device-authentication-information administration table, the CPU 11 determines that the CPU 11 cannot authenticate the extracted authentication information.

When the CPU 11 determines that the CPU 11 cannot authenticate the extracted authentication information (S717: No), this flow ends. When the CPU 11 determines that the CPU 11 can authenticate the extracted authentication information (S717: Yes), the CPU 11 executes the processing at S718, and this flow ends.

In this first embodiment, the device 10 and the administration server 100 communicate with each other according to the protocol for continuous connection, the administration server 100 can transmit the restriction information to the device 10 as needed at the timing when the administration server 100 receives the request of the function restriction from the service providing server 200. This configuration can restrict or limit the function of the device 10 at a desired timing.

The administration server 100 transmits the authentication URL indicating the destination of transmission of the authentication information, to the device 10 with the restriction information. Accordingly, the device 10 can use the received authentication URL to transmit the authentication information not to the administration server 100 but to the service providing server 200. The service providing server 200 transmits the authentication URL to the administration server 100 but does not transmit the authentication URL to the server authentication information. In the configuration in the first embodiment, accordingly, the server authentication information managed by the service providing server 200 is not known to the administration server 100, thereby reliably preventing leakage of the server authentication information.

When the administration server 100 receives the restriction information from the service providing server 200, the administration server 100 stores the information, e.g., the authentication URL, received with the restriction information, into the device administration table 121 in a state in which the information is associated with the device ID identifying the restriction requested device 10. For the device 10 having not transmitted the set information to the administration server 100, the administration server 100 associates the unset information with the device 10 as the setting status 121f of the device administration table 121. Accordingly, when the power source of the device 10 associated with the unset information as the setting status 121f is switched from OFF to ON, the administration server 100 can send the device 10 the restriction information and information stored in the device administration table 121 such as the authentication URL. As a result, even in a situation in which the administration server 100 cannot communicate with the device 10, for which the function restriction is requested, at the timing when the administration server 100 receives the request of the function restriction from the service providing server 200, the administration server 100 can restrict the execution of the function of the device 10 without acquiring each set of information from the service providing server 200 again.

The device 10 ignores the received restriction instruction when the function restriction based on the restriction information received from the administration server 100 has been set for the function to be restricted based on the restriction instruction received from the administration device. This configuration can prevent duplicate setting of the function restriction performed by the administration server 100 and the function restriction performed by the administration device.

The administration server 100 transmits the result notification URL indicating the destination of transmission of the result information, to the device 10 with the restriction information. This configuration allows the device 10 to transmit a result of the execution of the function for which restriction has been removed based on the authentication information, to the destination of transmission specified by the result notification URL, i.e., the service providing server 200. This configuration allows the service providing server 200 to manage a result of execution of the function of the device 10 which is used by the PC 50 on the LAN 500.

In the processings at S703-S707 (FIG. 7), when the function restriction performed by the administration server 100 such as the PC print restriction has been set on the device 10, the device 10 receives a job containing the authentication information, from the PC 50 on condition that the device 10 and the PC 50 communicate with each other according to the secure protocol such as IPPS. There is a possibility that the authentication information managed by a device on the Internet, such as the service providing server 200, (i.e., the server authentication information) is used for purposes other than restriction on the function of the device 10. Thus, in the event of leakage of the authentication information, great damage may be caused. In contrast, the device 10 in the first embodiment can receive the authentication information only when the device 10 and the PC 50 communicate with each other according to the secure protocol such as IPPS, resulting in reduction in risk of leakage of the server authentication information.

In the processings at S703 and S713-S715, on the other hand, when the function restriction performed by the administration device is set on the device 10, the device 10 receives a job containing the authentication information, from the PC 50 regardless of type of protocol used for the communication between the device 10 and the PC 50. The device authentication information is only for the device 10 that manages the device authentication information, and thus limited damage is caused in the event of leakage of the device authentication information. Accordingly, when the function restriction performed by the administration device is set, the device 10 can receive the authentication information from the PC 50 according to any communications protocol, thereby avoiding a situation in which the device 10 cannot receive the authentication information.

The authentication processing of the authentication information is executed by the service providing server 200 configured to manage the server authentication information. Thus, the service providing server 200 does not need to send the device 10 the server authentication information managed by the service providing server 200. This configuration can reduce the risk of leakage of the authentication information. Also, the device 10 does not need to manage the server authentication information, requiring a small amount of storage in a memory of the device 10. Also, the device 10 receives the authentication URL from the administration server 100, eliminating the need for the device 10 to manage the destination of transmission of the authentication information. Also, the device 10 can transmit the authentication information to a destination of transmission which is identified by the authentication URL received from the administration server 100.

The device 10 extracts the authentication information from the print job received from the PC 50 on the LAN 500 and transmits the extracted authentication information to the service providing server 200. Thus, the device 10 can receive the print job and the authentication information at the same time, resulting in reduction in the number of communications between the device 10 and the PC 50. Also, since the protocol inquiry request is contained in the print job, the device 10 can at the same time receive the print job and information for determining the communications protocol. This configuration can also reduce the number of communications between the device 10 and the PC 50.

The device 10 receives the print job containing the protocol inquiry request before the reception of the print job containing the authentication information. The device 10 determines the communications protocol used for the communication between the device 10 and the PC 50 in accordance with the protocol inquiry request. This configuration allows the device 10 to reliably receive the authentication information according to the secure protocol. On the other hand, even when the device 10 receives the print job containing the protocol inquiry request, according to a non-secure protocol, the device 10 transmits the protocol change request to the PC 50. Accordingly, even if the device 10 performs communication according to the non-secure protocol at first, the device 10 can reliably receive the authentication information according to the secure protocol.

The print data is contained in the print job containing the protocol inquiry request. When compared with the case where the print data is contained in a print job received by the device 10 after reception of the print job containing the protocol inquiry request, such as the print job containing the authentication information, the print data can be processed at an early timing, and printing can be finished earlier accordingly.

Figure 8B:
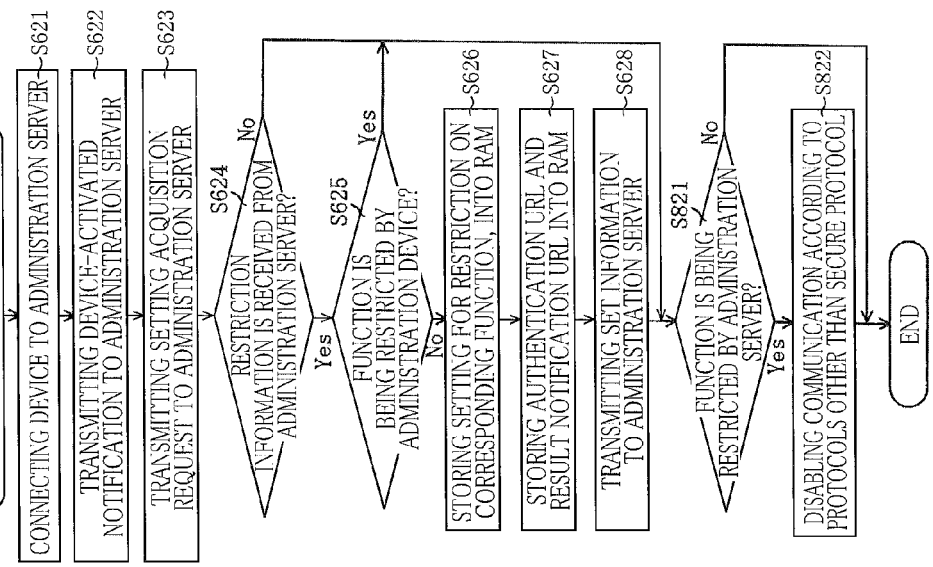
FIG. 8B is a flow chart illustrating a device turning-on processing in the second embodiment.
Figure 8A:
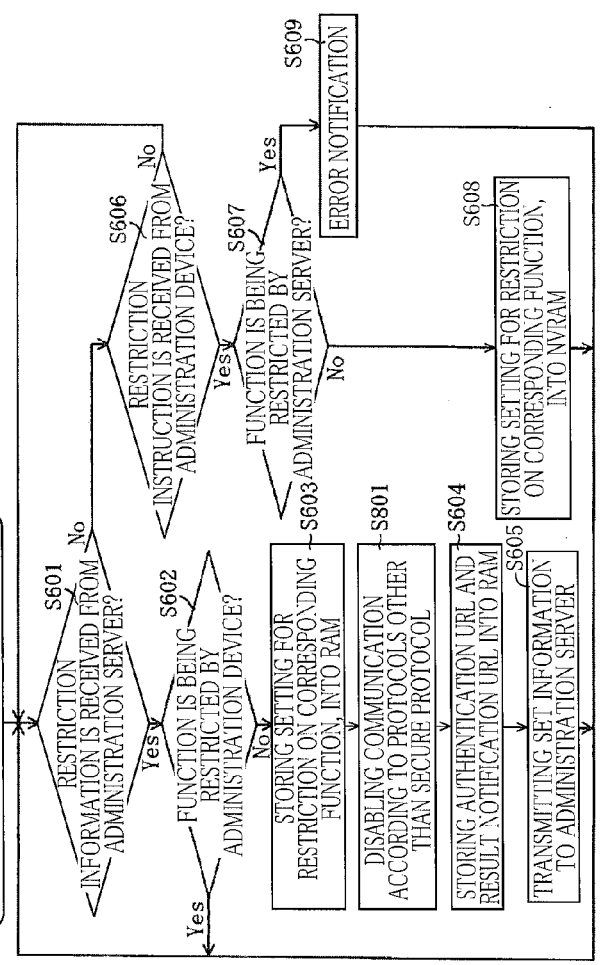
FIG. 8A is a flow chart illustrating a function restriction processing in a second embodiment.

There will be next explained a second embodiment with reference to FIGS. 8A and 8B. In the first embodiment, the device 10 receives the job containing the protocol inquiry request from the PC 50 before receiving the job containing the authentication information, and determines whether the communications protocol between the PC 50 and the device 10 is the secure protocol or not based on the protocol inquiry request. In this second embodiment, the device 10 for which the function restriction performed by the administration server 100, such as the PC print restriction, is set cannot communicate with the PC 50 according to protocols other than the secure protocol. It is noted that the same reference numerals as used in the first embodiment are used to designate the corresponding elements of the second embodiment, and an explanation of which is dispensed with. The following explanation focuses on a configuration specific to the second embodiment.

FIG. 8A is a flow chart illustrating a flow of a function restriction processing in the second embodiment, and FIG. 8B is a flow chart illustrating a flow of a device turning-on processing in the second embodiment. The processings illustrated in FIGS. 8A and 8B are executed by the CPU 11 according to the control program 12a in the second embodiment. As illustrated in FIG. 8A, when the device 10 receives the restriction information from the administration server 100, the CPU 11 executes the processing executed at S603, and at S801 disables communication according to protocols other than the secure protocol (e.g., IPPS).

As illustrated in FIG. 8B, the CPU 11 at S821 determines whether the function is being restricted by the administration server 100 or not. When the CPU 11 determines that the function is being restricted by the administration server 100 (S821: Yes), the CPU 11 at S822 disables communication according to protocols other than the secure protocol as in the processing at S801, and this flow ends. When the CPU 11 determines that the function is not being restricted by the administration server 100 (S821: No), the CPU 11 does not execute the processing at S822, and this flow ends.

In the second embodiment, the device 10 whose function is being restricted by the administration server 100 cannot communicate with the PC 50 according to protocols other than the secure protocol. As in the first embodiment, accordingly, the device 10 can receive the authentication information in the communication according to the secure protocol. This configuration can reduce the risk of leakage of the server authentication information.

Figure 9A:
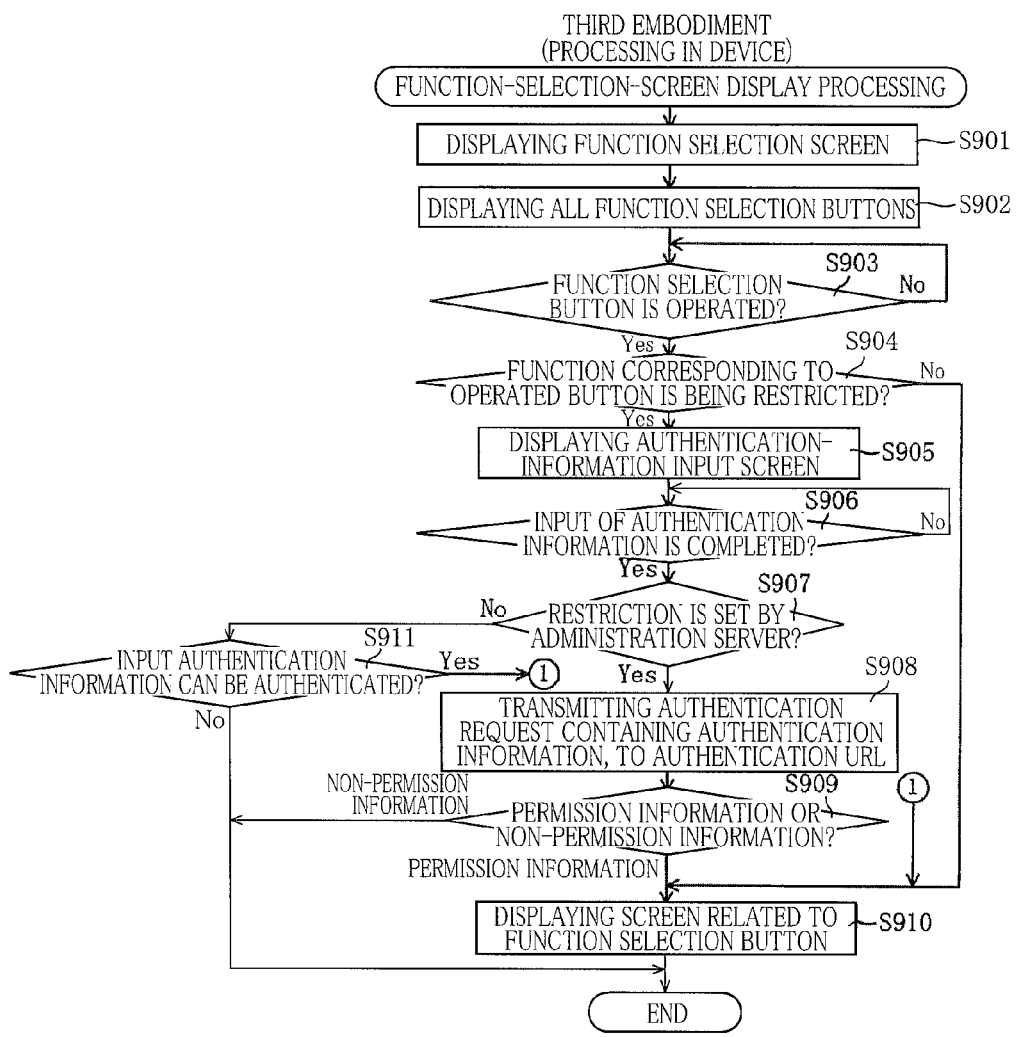
FIG. 9A is a flow chart illustrating a function-selection-screen display processing executed by the device in a third embodiment.

There will be next explained a third embodiment with reference to FIG. 9A. In the first embodiment, the authentication information for removing the PC print restriction is extracted from the print job transmitted from the PC 50. In this third embodiment, the LCD 16 displays an authentication-information input screen for input of the authentication information. It is noted that the same reference numerals as used in the first embodiment are used to designate the corresponding elements of the third embodiment, and an explanation of which is dispensed with.

FIG. 9A is a flow chart illustrating a flow of a function-selection-screen display processing which is executed by the CPU 11 of the device 10. The processings illustrated in FIG. 9A are executed by the CPU 11 according to the control program 12a in the third embodiment. The present processing relates to a function selection screen which is displayed on the LCD 16. The function selection screen prompts the user to select one of the functions of the device 10 which is to be used.

This flow begins with S901 at which the CPU 11 displays the function selection screen on the LCD 16. The CPU 11 at S902 displays all of function selection buttons on the function selection screen. The CPU 11 waits for acceptance of a user operation on one of the function selection buttons (S903: No). When the CPU 11 accepts an operation on one of the function selection buttons (S903: Yes), the CPU 11 at S904 determines whether or not the operated function selection button is a button corresponding to the function being restricted. When the CPU 11 determines that the operated function selection button is not a button corresponding to the function being restricted (S904: No), the CPU 11 at S910 controls the LCD 16 to display a screen related to the operated function selection button, instead of the screen currently displayed, and this flow ends.

When the CPU 11 determines that the operated function selection button is a function selection button corresponding to the function being restricted (S904: Yes), the CPU 11 at S905 controls the LCD 16 to display the authentication-information input screen instead of the function selection screen. The authentication-information input screen is for prompting the user to input the authentication information. The authentication-information input screen has input areas for receiving input of the user ID and the password, respectively. The CPU 11 waits for completion of input of the authentication information on the authentication-information input screen (S906: No).

When the CPU 11 determines that input of the authentication information is completed (S906: Yes), the CPU 11 at S907 determines whether the restriction on the function corresponding to the operated function selection button is set by the administration server 100 or not. When the CPU 11 determines that the restriction on the function is not set by the administration server 100 (S907: No), the CPU 11 at S911 determines, as in the processing at S717 in FIG. 7, whether the CPU 11 can authenticate the input authentication information or not, based on comparison between the input authentication information and the device authentication information stored in the NVRAM 14. When the CPU 11 determines that the CPU 11 cannot authenticate the input authentication information (S911: No), this flow ends. When the CPU 11 determines that the CPU 11 can authenticate the input authentication information (S911: Yes), this flow goes to S910.

When the CPU 11 determines that the restriction on the function is set by the administration server 100 (S907: Yes), the CPU 11 at S908 transmits the authentication request containing the input authentication information, to the service providing server 200 as in the processing at S709 (FIG. 7). The CPU 11 at S909 determines whether the information received from the service providing server 200 in response to the transmission of the authentication request is the permission information or the non-permission information. When the CPU 11 determines that the device 10 receives the non-permission information from the service providing server 200 (S909: non-permission information), this flow ends. When the CPU 11 determines that the device 10 receives the permission information from the service providing server 200 (S909: permission information), this flow goes to S910.

In the third embodiment, upon receiving the operation on the function selection button corresponding to the function being restricted, the device 10 displays the authentication-information input screen on the LCD 16. This configuration allows the user to easily recognize whether the function is being restricted or not based on whether the authentication-information input screen is displayed when the function selection button is operated.

Figure 9B:
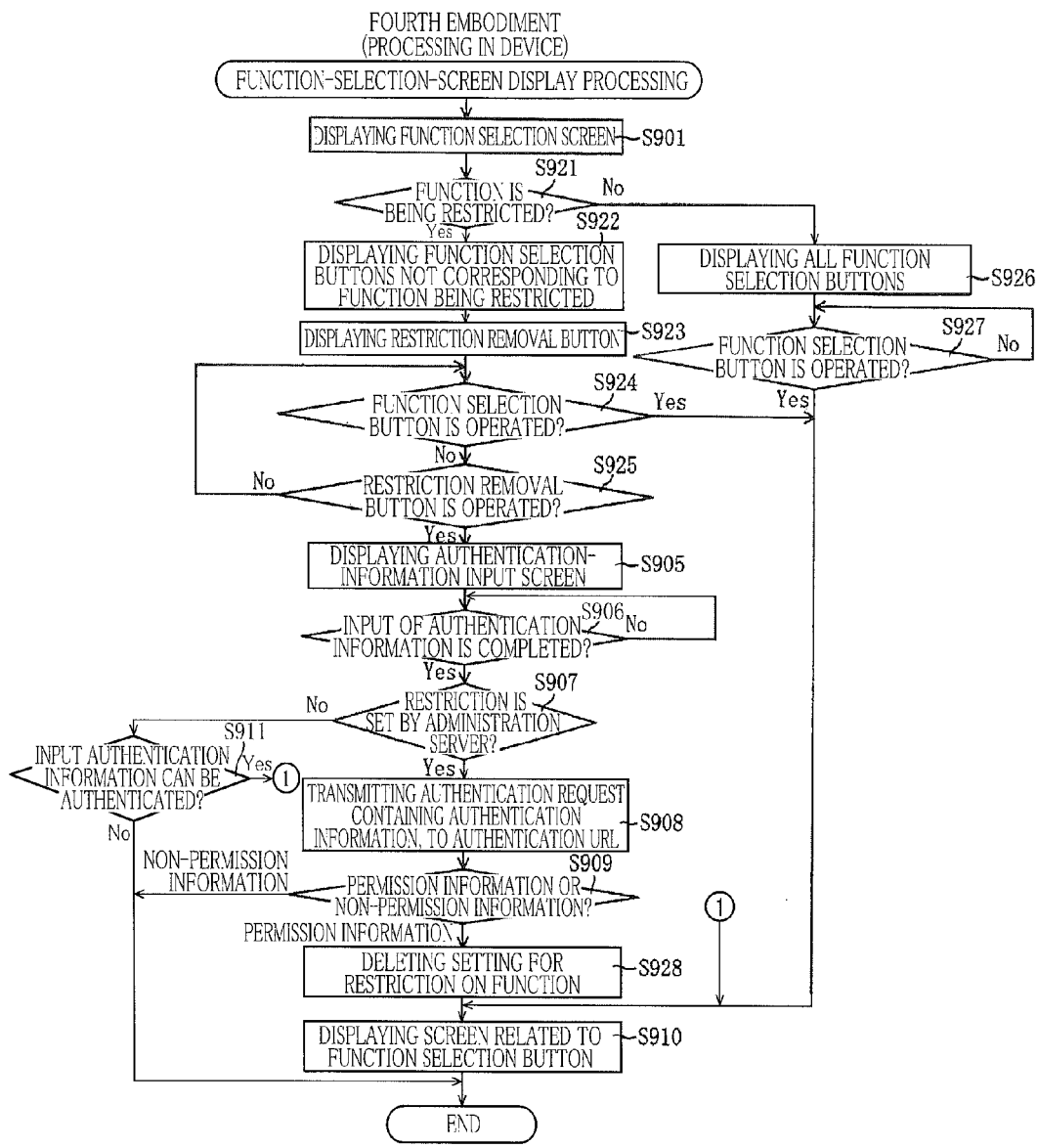
FIG. 9B is a flow chart illustrating a function-selection-screen display processing executed by the device in a fourth embodiment.

There will be next explained a fourth embodiment with reference to FIG. 9B. In the third embodiment, when the restricted function is used, authentication is performed for each user. In this fourth embodiment, in contrast, when the restricted function is used, the restriction on the function is removed. It is noted that the same reference numerals as used in the third embodiment are used to designate the corresponding elements of the fourth embodiment, and an explanation of which is dispensed with. The following explanation focuses on a configuration specific to the fourth embodiment.

FIG. 9B is a flow chart illustrating a flow of a function-selection-screen display processing in the fourth embodiment. The processings illustrated in FIG. 9B are executed by the CPU 11 according to the control program 12a in the fourth embodiment. As in the third embodiment, the present processing begins with S901 at which the CPU 11 displays the function selection screen on the LCD 16.

The CPU 11 at S921 determines whether any of the functions is being restricted or not. When the CPU 11 determines that no function is being restricted (S921: No), the CPU 11 at S926 displays all the function selection buttons on the function selection screen. The CPU 11 waits for acceptance of a user operation on one of the function selection buttons (S927: No). When the CPU 11 accepts the operation on the function selection buttons (S927: Yes), this flow goes to S910.

When the CPU 11 at S921 determines that any of the functions is being restricted (S921: Yes), the CPU 11 at S922 displays the function selection screen such that the function selection screen contains the function selection buttons respectively corresponding to functions other than the function being restricted. The CPU 11 at S923 displays a restriction removal button on the function selection screen, and this restriction removal button is for removing the function being restricted. The CPU 11 waits for acceptance of a user operation on any of the function selection buttons and the restriction removal button (S924: No, S925: No).

When the CPU 11 accepts the operation on the function selection button (S924: Yes), this flow goes to S910 because the operated function selection button is not restricted.

When the CPU 11 accepts the operation on the restriction removal button (S925: Yes), this flow goes to S905 at which the CPU 11 displays the authentication-information input screen on the LCD 16. In the present embodiment, the authentication information input on the authentication-information input screen is authentication information for removing the restriction on the function. The storage device 202 of the service providing server 200, for each function of the device 10, stores authentication information for removing restriction.

In the present embodiment, the service providing server 200 transmits restriction-removal-function information to the device 10 with the permission information. This restriction-removal-function information can identify the function for which restriction is to be removed. When the CPU 11 determines that the device 10 receives the permission information from the service providing server 200 (S909: permission information), the CPU 11 at S928 deletes, from the RAM 13, the setting for restriction on the function indicated by the restriction-removal-function information. As a result, the CPU 11 can remove the restriction set for the function.

In the fourth embodiment, the device 10 does not display the function selection button corresponding to the function being restricted. Thus, the user can easily recognize the restricted function, based on whether the function selection button is displayed or not. Also, when the device 10 receives the permission information from the service providing server 200, the device 10 deletes, from the RAM 13, the setting for restriction on the function to be removed. Accordingly, the restriction on the function can be removed.

While the embodiments have been described above, it is to be understood that the disclosure is not limited to the details of the illustrated embodiments, but may be embodied with various changes and modifications, which may occur to those skilled in the art, without departing from the spirit and scope of the disclosure.

While the multi-function peripheral is used as the device 10 in the above-described embodiments, for example, the present invention may be applied to a device having a single function, such as a printer and a scanner, and a device capable of performing a certain function, such as a sewing machine and a 3D printer. In the above-described embodiments, the printing function of the device 10 is used as the function, of which execution is restricted in accordance with the restriction information transmitted by the administration server 100. However, each function other than the printing function, such as the scanning function and the copying function, may be a function to be restricted.

While the device administration system 1 contains the single device 10 in the above-described embodiments, a plurality of the devices 10 may be contained in the device administration system 1. In the above-described embodiment, the single service providing server 200 is used as the service providing server 200 configured to communicate with the device 10. However, the device 10 may be configured to a plurality of the service providing servers 200. The plurality of the service providing servers 200 may be caused to respectively authenticate sets of the authentication information for different functions.

Each of the administration server 100 and the service providing server 200 is a single physical server in the above-described embodiments. Each of these servers 100, 200 may be a virtual machine which serves as one server by cooperation of a plurality of physical devices.

In the above-described embodiments, the administration server 100 configured to transmit the restriction information to the device 10 is separated from the service providing server 200 to which the authentication information is to be transmitted. Instead of this configuration, the device administration system 1 may use a server having the functions of the administration server 100 and the functions of the service providing server 200. In this modification, the server having the functions of the administration server 100 and the service providing server 200 is one example of a first server.

In the above-described embodiments, the administration server 100 transmits the restriction information to the device 10 when the administration server 100 receives the request of the function restriction from the service providing server 200. Instead of this configuration, the administration server 100 may be configured to transmit the restriction information to the device 10 independently of the service providing server 200.

In the above-described embodiments, the device 10 receives the authentication URL and the result notification URL with the restriction information. However, the authentication URL and the result notification URL may be stored in the device 10 in advance. Also, the result notification URL may not be received with the restriction information. For example, the result notification URL may be received with information, such as the permission information, which is received from the administration server 100 before the device 10 transmits the result notification.

In the above-described embodiments, the device administration system 1 is configured such that the device 10 transmits the authentication information to the service providing server 200, and the service providing server 200 executes the authentication processing for the received authentication information. Instead of this configuration, the device administration system 1 may be configured such that the service providing server 200 transmits the server authentication information to the device 10, and the device 10 executes the authentication processing. Also, the device 10 may be configured to manage the server authentication information.

In the above-described embodiments, when the service providing server 200 determines that the service providing server 200 can authenticate the authentication information received from the device 10, the service providing server 200 transmits the permission information to the device 10. The permission information transmitted from the service providing server 200 may contain information indicating the maximum number of printings (hereinafter may be referred to as "maximum number information"). In this modification, the device 10 having received the permission information containing the maximum number information can perform up to the maximum number of printings in accordance with the maximum number information.

The maximum number may be a value for each set of the authentication information or a fixed value which is set independently of the authentication information. For example, an initial value of the maximum number is set in the service providing server 200 at a particular timing, such as the start of every month, for each authentication URL, i.e., each set of the authentication information. Each time when the service providing server 200 receives the number of printed sheets from the device 10 as the result information, the service providing server 200 subtracts the received number from the maximum number corresponding to the authentication information. Upon authenting the authentication information received from the device 10, the service providing server 200 incorporates the maximum number information indicating the maximum number corresponding to the authentication information, into the permission information and transmits them to the device 10.

While the device 10 is configured to transmit the result information to the service providing server 200 in the above-described embodiments, the device 10 may be configured to transmit the result information to the administration server 100. In this modification, the administration server 100 at least needs to send the service providing server 200 the result information received from the device 10.

In the first-third embodiments, authentication is performed for each user, and the authenticated user is allowed to use the restricted function. As in the fourth embodiment, however, the restriction provided on the function may be removed upon authentication. In the present modification, not the authentication information constituted by the user ID and the password but the authentication information for removing the restriction on the function may be used as in the fourth embodiment. Also, in the present modification, the device 10 may execute a processing similar to the processing at S928 in response to receiving the permission information.

In the fourth embodiment, the device 10 displays the function selection buttons on the function selection screen for the functions other than the function being restricted. Instead of this configuration, the device 10 may be configured to display all the function selection buttons on the function selection screen but disallow acceptance of operation by, for example, graying out the function selection button corresponding to the function being restricted.

The print data is contained in the print job containing the protocol inquiry request in the above-described embodiments but may be contained in the print job containing the authentication information.

In the above-described embodiments, the administration device for the device 10 is capable of restricting the execution of the function of the device 10 independently of the administration server 100. The user may operate the operation keys 15 of the device 10 and/or key images displayed on the LCD 16 to set function restriction similar to the function restriction set by the administration device.

In the above-described embodiments, the device 10 is off-line in the case where the power source of the device 10 is OFF. Since the device 10 is off-line also in the case where the device 10 and the administration server 100 do not communicate with each other, the present invention may be applied also in this case as in the above-described embodiments. In this modification, the device 10 may execute processing similar to the processings at S623-S628 upon re-establishment of communication with the administration server 100.

In the third embodiment, the authentication-information input screen is displayed when the function selection button corresponding to the function being restricted is operated. However, the function selection button may be replaced with a button for starting execution of the function (hereinafter may be referred to as "function performing button") such as a print performing button. For example, the authentication-information input screen may be displayed when the function performing button corresponding to the function being restricted is operated. Likewise, the function performing button may be used instead of the function selection button also in the fourth embodiment. That is, the function performing button corresponding to the function being restricted may not be displayed. The function selection buttons or the restriction removal button is a key image displayed on the LCD 16 in the third and fourth embodiments. However, in the case where the device 10 includes a mechanical key assigned as the operation key 15, the function selection buttons or the restriction removal button may be the mechanical key.

While the controller 101 or the CPU 11 executes the processings illustrated in FIGS. 5-9B in the above-described embodiments, but a plurality of CPUs may be cooperated to execute these processings. Also, IC or ICs, such as ASIC, may execute the processings alone or in combination. Also, the CPU 11 and the IC such as the ASIC may be cooperated to execute the processings. Some of the processings illustrated in FIGS. 5-9B may be omitted or modified without departing from the spirit and scope of the disclosure. The features in the above-described embodiments and the above-described modifications may be combined as needed.

In the above-described embodiments, the device administration system 1 is one example of a device administration system. The device 10 is one example of a device. The administration server 100 is one example of the first server. The service providing server 200 is one example of a second server. The PC 50 is one example of an external device. The RAM 13 is one example of a storage. The CPU 11 is one example of a device controller. The storage device 202 is one example of a second server storage. The storage device 102 is one example of a first server storage. The LCD 16 is one example of the display. Each of the function selection buttons is one example of an operation unit and a first operation unit. The restriction removal button is one example of a second operation unit. The Internet 800 is one example of the Internet. The LAN 500 is one example of a local area network. Each of the authentication information contained in the print job and the authentication information contained in the authentication-information input screen is one example of authentication information. The authentication URL is one example of first destination information. The permission information received by the device 10 from the service providing server 200 is one example of permission information. XMPP over BOSH is one example of a first communications protocol. HTTP is one example of a second communications protocol. The device ID is one example of identification information. The result notification URL is one example of second destination information. The print job is one example of a job relating to execution of the function. The authentication-information input screen is one example of an input area for input of the authentication information.

The processing at S504 which is executed by the controller 101 is one example of a first transmission process and a fifth transmission process. The processing at S603 which is executed by the CPU 11 is one example of a first restriction process. The processing at S604 which is executed by the CPU 11 is one example of a first storing process. Each of the processings at S707 and S906 which is executed by the CPU 11 is one example of a first acceptance process. Each of the processings at S709 and S908 which is executed by the CPU 11 is one example of a second transmission process. Each of the processings at S710, S909, and S928 which is executed by the CPU 11 is one example of a restriction removing process. The processing at T26 which is executed by the service providing server 200 is one example of a third transmission process. The processing at T1 which is executed by the service providing server 200 is one example of a fourth transmission process. The processing at S502 which is executed by the controller 101 is one example of a second storing process. The processing at S503 which is executed by the controller 101 is one example of a first determination process. The processing at S712 which is executed by the CPU 11 is one example of a sixth transmission process. The processing at S903 which is executed by the CPU 11 is one example of a second acceptance process. The processing at S905 which is executed by the CPU 11 is one example of a display process. The processing at S922 which is executed by the CPU 11 is one example of a disabling process. The processing at S925 which is executed by the CPU 11 is one example of a third acceptance process. The processing at S606 which is executed by the CPU 11 is one example of a fourth acceptance process. The processing at S608 which is executed by the CPU 11 is one example of a second restriction process.

What is claimed is:

1. A device administration system, comprising:
a particular device comprising a storage and a device controller, the particular device being configured to perform a plurality of functions; and
a first server comprising a first controller,
wherein the first controller of the first server is configured to execute:
transmitting restriction information and first destination information to the particular device without a request from the particular device, the restriction information being for placing particular restriction on a particular function that is one of the plurality of functions, and
wherein the device controller of the particular device is configured to execute:
receiving the restriction information and the first destination information transmitted from the first server;
placing the particular restriction on the particular function corresponding to the received restriction information;
storing the received first destination information into the storage;
accepting input of authentication information;
transmitting the inputted authentication information to a destination device indicated by the first destination information stored in the storage;
receiving permission information from the destination device; and
upon receiving the permission information, canceling the particular restriction on the particular function,
wherein the destination device is a second server, and
wherein the second server comprises:
a second server storage configured to store particular authentication information managed by the second server; and
a second controller,
wherein the second controller is configured to execute:
receiving the inputted authentication information transmitted from the particular device;
determining whether the received inputted authentication information is identical to the particular authentication information stored in the second server storage;
when the received inputted authentication information is identical to the particular authentication information, transmitting the permission information to the particular device,
wherein each of the first server and the second server is on the Internet,
wherein the second controller of the second server is configured to execute:

transmitting the first destination information and identification information to the first server, the identification information identifying the particular device,
wherein the first controller of the first server is configured to execute:
receiving the first destination information and the identification information transmitted from the second server; and
transmitting the restriction information and the first destination information to the particular device identified by the received identification information without the request from the particular device,
wherein the first server comprises a first server storage,
wherein the first controller of the first server is configured to execute:
storing the received first destination information into the first server storage in a state in which the received first destination information is associated with the received identification information;
upon receiving the first destination information and the identification information, determining whether the first server is allowed to communicate with the particular device identified by the received identification information;
upon determining that the first server is allowed to communicate with the particular device, transmitting the received first destination information and the restriction information to the particular device identified by the received identification information; and
upon determining that the first server is allowed to communicate with the particular device after determining that the first server is not allowed to communicate with the particular device, transmitting the restriction information and particular first destination information to the particular device, and
wherein the particular first destination information is one of the first destination information stored in the first server storage, and the particular first destination information is associated with the identification information identifying the particular device with which the first controller determines that the first server is not allowed to communicate.

2. The device administration system according to claim 1, wherein the first controller of the first server is configured to transmit second destination information to the particular device as a destination of the restriction information,
wherein the second destination information indicates a particular destination of transmission and is associated with the transmitted restriction information,
wherein the device controller of the particular device is configured to execute:
determining whether the restriction of the use of the function is canceled in response to reception of the permission information; and
upon determining that the restriction of the use of the function is canceled, transmitting result information to the destination of transmission indicated by the transmitted second destination information from the first server, in a state in which the result information is associated with second identification information contained in the received permission information, and wherein the result information indicates a result of the use of the function for which the restriction is canceled.

3. The device administration system according to claim 1, wherein the device controller of the particular device is configured to accept authentication information which is received by the particular device from an external device located on a local area network and which is contained in a job relating to the use of the function.

4. The device administration system according to claim 1, wherein the particular device comprises:
a display; and
an operation unit for an operation performed for use of each of the plurality of functions of the particular device,
wherein the device controller of the particular device is configured to execute:
accepting an operation for the operation unit;
determining whether the accepted operation is an operation for the use of the restricted function;
upon determining that the accepted operation is an operation for the use of the restricted function, controlling the display to display an input area for input of the authentication information; and
accepting the authentication information inputted to the displayed input area.

5. The device administration system according to claim 1, wherein the particular device comprises:
a display;
a first operation unit for an operation performed for use of each of the plurality of functions of the particular device; and
a second operation unit different from the first operation unit,
wherein the device controller of the particular device is configured to execute:
accepting an operation for the first operation unit;
in a state in which the use of the function is restricted, disabling an operation for the first operation unit corresponding to the function of which use is restricted, or making the operation impossible;
accepting the operation for the second operation unit in the state in which the use of the function is restricted;
determining whether the operation for the second operation unit is accepted;
upon determining that the operation for the second operation unit is accepted, controlling the display to display an input area for input of the authentication information; and
accepting the authentication information inputted to the displayed input area.

6. The device administration system according to claim 1, wherein the device controller of the particular device is configured to execute:
accepting an instruction for restricting a use of a function, which instruction is input to the particular device independently of the restriction information;
determining whether the use of the function is restricted at the acceptance of the instruction; and
upon determining that the use of the function is not restricted at the acceptance of the instruction, restricting the use of the function corresponding to the accepted instruction.

* * * * *